(12) United States Patent
Chai et al.

(10) Patent No.: US 9,532,360 B2
(45) Date of Patent: Dec. 27, 2016

(54) METHOD AND APPARATUS FOR COMMUNICATION MODE SWITCHING

(71) Applicant: Huawei Technologies Co., Ltd., Shenzhen (CN)

(72) Inventors: Li Chai, Shenzhen (CN); Bo Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 100 days.

(21) Appl. No.: 14/228,961

(22) Filed: Mar. 28, 2014

(65) Prior Publication Data

US 2014/0213221 A1    Jul. 31, 2014

Related U.S. Application Data

(63) Continuation of application No. PCT/CN2012/082418, filed on Sep. 29, 2012.

(30) Foreign Application Priority Data

Sep. 29, 2011   (CN) .......................... 2011 1 0293285

(51) Int. Cl.
*H04W 72/04* (2009.01)
*H04W 36/30* (2009.01)
(Continued)

(52) U.S. Cl.
CPC ......... *H04W 72/0493* (2013.01); *H04W 36/30* (2013.01); *H04W 76/023* (2013.01); *H04W 88/06* (2013.01)

(58) Field of Classification Search
CPC .............................. H04W 76/023; H04W 36/30
See application file for complete search history.

(56) References Cited

U.S. PATENT DOCUMENTS 6,415,146 B1    7/2002 Capece
2007/0133491 A1    6/2007 Ushiki et al.
(Continued)

FOREIGN PATENT DOCUMENTS

CN    1619993 A    5/2005
CN    102026307 A    4/2011
(Continued)

OTHER PUBLICATIONS

Lte, "3rd Generation Partnership Project; Technical Specification Group Radio Access Network; Evolved Universal Terrestrial Radio Access (E-UTRA); Radio Resource Control (RRC); Protocol specification" (Release 10) 3GPP TS 36.331, V10.2.0, Jun. 2011, 294 pages.

*Primary Examiner* — Vladimir Magloire
*Assistant Examiner* — Ernest Tacsik
(74) *Attorney, Agent, or Firm* — Brinks Gilson & Lione

(57) ABSTRACT

Embodiments of the present invention provide a method and an apparatus for communication mode switching. The method includes: acquiring state information of a device-to-device link between a first UE and a second UE; implementing a switching between a first communication mode and a second communication mode according to the state information of the device-to-device link between the first UE and the second UE, where the first UE and the second UE perform device-to-device communication under the first communication mode, and the first UE communicates with the second UE via a base station under the second communication mode.

11 Claims, 8 Drawing Sheets

(51) Int. Cl.
*H04W 76/02* (2009.01)
*H04W 88/06* (2009.01)

(56) References Cited

U.S. PATENT DOCUMENTS

| | | |
|---|---|---|
| 2010/0009675 A1* | 1/2010 | Wijting et al. ............ 455/426.1 |
| 2010/0165882 A1* | 7/2010 | Palanki et al. ................ 370/254 |
| 2010/0177739 A1* | 7/2010 | Huang .................. H04W 36/02 370/331 |
| 2010/0279672 A1 | 11/2010 | Koskela et al. |
| 2010/0323700 A1* | 12/2010 | Bachmann et al. .......... 455/436 |
| 2011/0149905 A1* | 6/2011 | Kim .............................. 370/331 |

FOREIGN PATENT DOCUMENTS

| | | |
|---|---|---|
| EP | 2012480 A1 | 1/2009 |
| JP | 2009-17559 A | 1/2009 |
| JP | 2012-514435 A | 6/2012 |
| WO | WO 2010/078271 A2 | 7/2010 |
| WO | WO 2011/036507 A1 | 3/2011 |
| WO | WO 2011/059818 A1 | 5/2011 |

\* cited by examiner

METHOD AND APPARATUS FOR COMMUNICATION MODE SWITCHING

CROSS-REFERENCE TO RELATED APPLICATIONS

This application is a continuation of International Application No. PCT/CN2012/082418, filed on Sep. 29, 2012, which claims priority to Chinese Patent Application No. 201110293285.9, filed on Sep. 29, 2011, both of which are hereby incorporated by reference in their entireties.

TECHNICAL FIELD

Embodiments of the present invention relate to the field of communication technology, and more particularly to a method and an apparatus for communication mode switching.

BACKGROUND

With the development of mobile communication technologies, there is an ever increasing demand for a bandwidth. Since spectrum resources of mobile communications are limited, it becomes more important to effectively utilize the bandwidth.

A D2D (Device to Device, device-to-device) system can provide services, such as information sharing, gaming, social interaction and mobile advertising. The D2D device, as a broadcast node, broadcasts character string information so that its peer-to-peer device can know its identifying characteristic, service and content. After the information is received, if there is a need to obtain more detailed information, the peer-to-peer device transmits "paging" signaling to the broadcast node, and the broadcast node directly establishes a connection with the peer-to-peer device after the signaling is received. A local radio resource of the D2D system may be divided into 224 links, and each link is corresponding to a connection identifier. The D2D device has a cognitive function, that is, it can autonomously perceive external environment, and perform autonomous resource management and configuration based on a perceived result.

Currently, applying D2D communication technology in the cellular system can improve spectrum utilization. For example, the D2D system can share the same resource with the cellular system by means of a sharing mode (Underlay), so as to improve the spectrum utilization. However, the mutual switching between a D2D communication mode and a communication mode controlled by a base station have not yet been realized in the prior art, and thus spectrum resources of a cellular system cannot be utilized effectively.

SUMMARY

Embodiments of the present invention provide a method and an apparatus for communication mode switching, so that spectrum resources of a cellular system can be utilized effectively.

In an aspect, there is provided a method for communication mode switching, including: acquiring state information of a device-to-device link between a first UE and a second UE; implementing a switching between a first communication mode and a second communication mode according to the state information of the device-to-device link between the first UE and the second UE, where the first UE and the second UE perform device-to-device communication under the first communication mode, and the first UE communicates with the second UE via a base station under the second communication mode.

In another aspect, there is provided a method for communication mode switching, including: receiving a first release message from a first UE, so as to switch a first communication mode to a second communication mode, where the first UE and a second UE perform device-to-device communication under the first communication mode, and the first UE communicates with the second UE via a base station under the second communication mode; updating a connection between the base station and the first UE and/or a connection between the base station and the second UE; releasing a connection between the first UE and the second UE; transmitting a second release message to the second UE, so that the second UE can release the connection between the first UE and the second UE.

In another aspect, there is provided a method for communication mode switching, including: receiving a release message from a base station; releasing a connection between the first UE and the second UE after the release message is received, or forwarding the release message to the second UE and releasing the connection between the first UE and the second UE after the release message is received, so as to switch a first communication mode to a second communication mode, wherein the first UE and the second UE perform device-to-device communication under the first communication mode, and the first UE communicates with the second UE via the base station under the second communication mode.

In another aspect, there is provided an apparatus for communication mode switching, including: an acquisition module, configured to acquire state information of a device-to-device link between a first UE and a second UE; a switching module, configured to implement a switching between a first communication mode and a second communication mode according to the state information of the device-to-device link between the first UE and the second UE, where the first UE and the second UE perform device-to-device communication under the first communication mode, and the first UE communicates with the second UE via a base station under the second communication mode.

In another aspect, there is provided an apparatus for communication mode switching, including: a receiving module, configured to receive a first release message from a first UE, so as to switch a first communication mode to a second communication mode, where the first UE and a second UE perform device-to-device communication under the first communication mode, and the first UE communicates with the second UE via a base station under the second communication mode; a switching module, configured to update a connection between the base station and the first UE and/or a connection between the base station and the second UE, and releases a connection between the first UE and the second UE.

In another aspect, there is provided an apparatus for communication mode switching, including: a receiving module, configured to receive a release message from a base station; a switching module, configured to release a connection between the first UE and the second UE after the release message is received, or forward the release message to the second UE and release the connection between the first UE and the second UE after the release message is received, so as to switch a first communication mode to a second communication mode, where the first UE and the second UE perform device-to-device communication under the first communication mode, and the first UE communicates with the second UE via the base station under the second communication mode.

In the above technical solutions, a switching between a D2D communication mode and a communication mode in which the communication is realized via a base station can be implemented according to the link quality information or distance information between D2D devices, so that spectrum resources of a cellular system can be utilized effectively.

BRIEF DESCRIPTION OF DRAWINGS

To illustrate the technical solutions in embodiments of the present invention more clearly, accompanying drawings needed in embodiments or the prior art are illustrated briefly in the following. Apparently, the accompanying drawings merely show certain embodiments of the present invention, and persons skilled in the art can derive other drawings from them without creative efforts.

DESCRIPTION OF EMBODIMENTS

Figure 1:
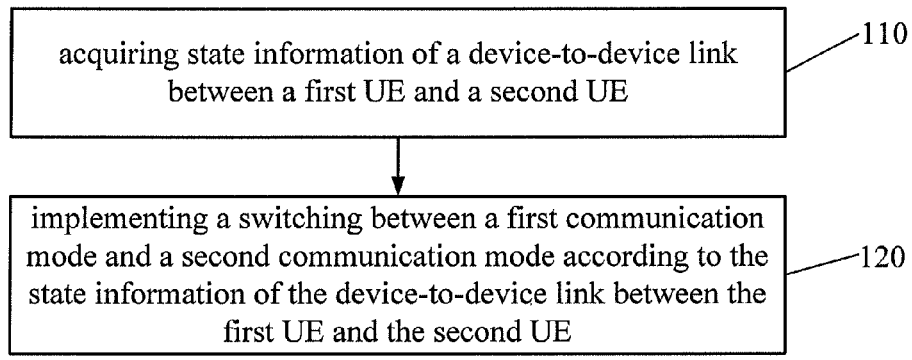
FIG. 1 is a schematic flow chart of a method for communication mode switching according to an embodiment of the present invention.

The technical solutions in embodiments of the present invention are hereinafter described clearly and completely with reference to the accompanying drawings in embodiments of the present invention. Obviously, the embodiments described here are part of embodiments of the invention rather than all of the embodiments. All other embodiments obtained by persons skilled in the art according to embodiments of the present invention without any creative efforts all fall within the protection scope of the present invention.

It should be understood that, technical solutions of the present invention are applicable to various communication systems, such as global system of mobile communication (GSM, Global System of Mobile communication) system, code division multiple access (CDMA, Code Division Multiple Access) system, wideband code division multiple access (WCDMA, Wideband Code Division Multiple Access) system, general packet radio service (GPRS, General Packet Radio Service), long term evolution (LTE, Long Term Evolution) system, advanced long term evolution (LTE-A, Advanced long term evolution) system and universal mobile telecommunication system (UMTS, Universal Mobile Telecommunication System). Embodiments of the present invention will be described by taking an LTE network and/or an LTE-A network as an example, but the present invention is not limited thereto.

It should be understood that, a user equipment (UE, User Equipment), which may also be called a mobile terminal (Mobile Terminal) or a mobile user equipment and so on, can communicate with one or more core networks via a wireless access network (for example, RAN, Radio Access Network), the user equipment may be a mobile terminal, such as a mobile phone (or be called a "cellular" phone) and a computer with a mobile terminal, and thus may be, for example, portable, pocket, hand-held, computer-included, or car-mounted mobile devices which communicate voice and/or data with a radio access network.

It should also be understood that, the base station may be a base station (BTS, Base Transceiver Station) in GSM or CDMA, or a base station (NodeB) in WCDMA, or an evolved base station (eNB or e-NodeB, evolutional Node B) in LTE, and the present invention is not limited thereto, for ease of description only, the embodiments below will be described by taking an eNB as an example.

A D2D device of a D2D system can perform communication under control of a base station. The base station can coordinate direct communication between the D2D devices and communication between the D2D device and the base station, so that interference can be avoided, for example, the D2D device shall follow a time and a time slot of the cellular system in case of accessing to the cellular system. Under the D2D communication mode, two D2D devices can establish a D2D radio bearer and a corresponding D2D link according to resources allocated by the cellular system, and can directly perform service transmission through the D2D link rather than through the base station. Under a communication mode that two UEs communicate through a base station (hereinafter referred to as UE to base station, or UE to eNB for short), the two UEs can establish an EPS (Evolved Packet System, evolved packet system) bearer and a corresponding link according to resources allocated by the cellular system, and perform service transmission through the link. However, how to perform mutual switching between two communication modes in time so as to effectively utilize spectrum of the cellular system is a very important issue.

FIG. 1 is a schematic flow chart of a method for communication mode switching according to an embodiment of the present invention. The method in FIG. 1 may be implemented by a base station or a UE.

110, acquiring state information of a D2D link between a first UE and a second UE.

The state information of the D2D link may be a link quality parameter or a distance parameter, embodiments of the present invention are not limited thereto, and it may also be other information for characterizing state information of the D2D link. For example, the link quality parameter can be a measurement result obtained by measuring a measurement object for measuring link quality in a cellular system. The measurement object includes a sounding reference signal (SRS, Sounding Reference Signal), a cell-specific reference signal (CRS, Cell-specific Reference Signal) and etc., and may also be a reference signal specifically designed for measurement of the D2D link, which is referred to as a D2D link-specific reference signal (D2DRS). Embodiments of the present invention may judge mode switching depending on the link quality parameter, such as RSRP (Reference Signal Receiving Power, reference signal receiving power)/RSRQ (Reference Signal Receiving Quality, reference signal receiving quality), obtained by UE by measuring the measurement object, but embodiments of the present invention are not limited to the specific manners of the above parameters. In addition, the distance parameter may be measured by a length or a signal propagation time.

For example, the base station may configure a device supporting a D2D function with measurement control which is used for communication mode switching, including the above measurement object. The UE may measure the D2D link according to the measurement control configured by the base station, so as to acquire state information of the D2D link between the first UE and the second UE, and the base station may acquire the state information from the UE, but embodiments of the present invention are not limited thereto, for example, the base station may acquire a distance parameter according to position information of a D2D device, and the D2D device may acquire the distance parameter according to a timing advance (TA, Timing Advance) information transmitted between the two D2D devices.

120, implementing a switching between a first communication mode and a second communication mode according to the state information of the D2D link between the first UE and the second UE, where the first UE and the second UE perform D2D communication under the first communication mode, and the first UE communicates with the second UE via a base station under the second communication mode.

For example, the judging the mode switching may be implemented by a base station or a UE, and when the link quality parameter or the distance parameter satisfies a threshold for mode switching, the switching between a first communication mode and a second communication mode may be jointly implemented by the base station and the UE. A first communication mode may be switched to a second communication mode, or a second communication mode may be switched to a first communication mode, based on different thresholds for mode switching. The D2D communication performed by the first UE and the second UE may be that the first UE and the second UE perform the service transmission through the D2D link directly, and the communication via a base station performed by the first UE and the second UE may be that the first UE and the second UE perform service transmission through a link between the first UE and the base station and a link between the second UE and the base station, respectively.

According to embodiments of the present invention, the switching from the first communication mode to the second communication mode may include: updating a connection between the first UE and the base station and a connection between the second UE and the base station, and releasing a connection between the first UE and the second UE. The switching from the second communication mode to the first communication mode includes: configuring a connection between the first UE and the second UE, and updating a connection between the first UE and the base station, and a connection between the second UE and the base station.

The above technical solutions can, according to the state information of the link between D2D devices, implement a switching between a D2D communication mode and a UE to base station communication mode, so that spectrum resources of a cellular system can be utilized effectively.

In 120, switch the first communication mode to the second communication mode, when the link quality parameter between the first UE and the second UE is less than a first preset threshold, or the distance parameter between the first UE and the second UE is greater than a second preset threshold.

For example, when a link quality parameter between two D2D devices is less than a preset threshold or a distance between the two D2D devices is greater than a preset threshold, it means that communication between the two D2D devices is no longer appropriate, an instant switching from the D2D communication mode to the UE to base station communication mode can improve the spectrum utilization and meanwhile increase reliability of service transmission. In a case that the first UE executes the judging of mode switching, the threshold may be obtained from the base station through a dedicated signaling message or an existing message, and may also be pre-stored in the D2D device.

In 120, switch the second communication mode to the first communication mode, when the link quality parameter between the first UE and the second UE is greater than a third preset threshold, or the distance parameter between the first UE and the second UE is less than a fourth preset threshold.

For example, when a link quality between two D2D devices is greater than a preset threshold or a distance between the two D2D devices is less than a preset threshold, it means that a D2D communication between the two D2D devices is appropriate, an instant switching from the UE to base station communication mode to a D2D communication mode can facilitate to improve the spectrum utilization.

It should be noted that, the first threshold and the third threshold may be the same, the second threshold and the fourth threshold may also be the same, but embodiments of the present invention are not limited thereto, for example, there may be a preset difference value between the first threshold and the second threshold as well as the third threshold and the fourth threshold, setting an appropriate threshold for mode switching can avoid frequently switching between the two communication modes.

It should be noted that, when switching the first communication mode to the second communication mode, or switching the second communication mode to the first communication mode, it is possible to merely switch services transmitted between the first UE and the second UE, while service between the first UE or the second UE with other UEs is not affected by the switching.

The method for communication mode switching provided in embodiments of the present invention will be described in detail in the following from the point of executing the judging of mode switching by the UE with reference to FIG. 1.

In 110, the first UE acquires measurement control information from the base station; the first UE measures a link between the first UE and the second UE according to the measurement control information, so as to acquire the link quality parameter between the first UE and the second UE. Optionally, in 110, the first UE acquires the distance parameter between the first UE and the second UE according to timing advance information transmitted between the first UE and the second UE, or the first UE acquires, the distance parameter between the first UE and the second UE from the base station, where the distance parameter is acquired by the base station according to the position information of the first UE and the second UE.

For example, the measurement control information may carry measurement configuration information, a communication mode switching threshold or a measurement event parameter, and the UE can obtain a measurement result of D2D link according to the measurement control information. The measurement control information may be transmitted in a manner of a dedicated signaling message or be carried by an existing message.

In 120, when there is a need to switch the first communication mode to the second communication mode, the first UE may transmit a first release message to the base station, so that the base station release the connection between the first UE and the second UE, and updates the connection between the base station and the first UE and/or the connection between the base station and the second UE; the first UE transmits a second release message to the second UE, so that the second UE releases the connection between the first UE and the second UE; the first UE releases the connection between the first UE and the second UE.

For example, the first release message may be transmitted in a manner of a dedicated signaling message or be carried by an existing message, and is used for indicating the base station to switch the first communication mode to the second communication mode. The base station releases the connection between the first UE and the second UE, which means the base station releases configuration of the connection between the first UE and the second UE, that is, the base station deletes configuration information relevant to the D2D connection. The first UE releases the connection between the first UE and the second UE, which means the first UE releases configuration of the connection between the first UE and the second UE, that is, the first UE deletes configuration relevant to the connection.

In 120, when there is a need to switch the second communication mode to the first communication mode, the first UE may transmit a D2D connection establishment request message to the base station, so that the base station configures the connection between the first UE and the second UE; the first UE receives the configuration information of the connection between the first UE and the second UE from the base station; the first UE configures the connection between the first UE and the second UE according to the configuration information. The D2D connection establishment request message may adopt the manner of a dedicated signaling message or may adopt an existing message, for example, adopt an existing request message for initiating a process of establishing a D2D connection, and information for indicating switching the second communication mode to the first communication mode is carried in the request message.

According to another embodiment of the present invention, in a case of switching the first communication mode to the second communication mode, the method further includes: a first UE transmits PDCP (Packet Data Convergence Protocol, packet data convergence protocol) SDU (Service Data Unit, service data unit) data to the base station, where the PDCP SDU has been transmitted by the first UE to the second UE but no acknowledged feedback (such as, ACK) has been received or a not-acknowledged feedback (such as, NACK) has been received; the first UE transmits, to the base station, SDU data without a PDCP sequence number, a termination identifier packet and a first sequence number corresponding to the SDU data without the PDCP sequence number, so that the base station numbers the SDU data without the PDCP sequence number until the termination identifier packet, according to the sequence number.

For example, in a case of switching the first communication mode to the second communication mode, a PDCP entity associated with the bearer in the second UE firstly receives some PDCP SDUs from the first UE, and starts to receive the PDCP SDU from the base station after the switching, because some PDCP SDUs have been forwarded to the base station by the first UE, and also some PDCP SDUs have been transmitted by the first UE to the second UE but have not been acknowledged, the PDCP SDUs received before and after by the PDCP entity of the second UE may be scrambled, and may also be repeated. According to an embodiment of the present invention, re-transmit the PDCP SDU which has not been acknowledged, and numbering, by the base station, the SDU data without the PDCP sequence number, so that the second UE can accordingly overcome problems of scrambling and repetition, and service continuity in the process of communication mode switching can be guaranteed.

According to another embodiment of the present invention, in a case of switching the second communication mode to the first communication mode, the method further includes: a first UE receives PDCP SDU data from the base station, where the PDCP SDU data has been transmitted by the first UE to the second UE but no acknowledged feedback has been received or a not-acknowledged feedback has been received; a first UE receives, from the base station, SDU data without a PDCP sequence number, a termination identifier packet and a first sequence number corresponding to the SDU data without the PDCP sequence number; the first UE numbers the SDU data without the PDCP sequence number until the termination identifier packet, according to the sequence number; the first UE transmits the PDCP SDU data and the numbered SDU data to the second UE. The case of switching the second communication mode to the first communication mode is similar to the case of switching the first communication mode to the second communication mode, and the details will not be described herein again.

As mentioned above, the method for communication mode switching provided in embodiments of the present invention has been described in detail from the point of executing the judging of mode switching by the UE with reference to FIG. 1, and hereinafter, the method for communication mode switching provided in embodiments of the present invention will be described in detail from the point of executing the judging of mode switching by the base station with reference to FIG. 1.

In 110, the base station transmits measurement control information to the first UE, so that the first UE measures a link between the first UE and the second UE according to the measurement control information; the base station receives a measurement result from the first UE, and acquires the link quality parameter between the first UE and the second UE according to the measurement result.

Optionally, the base station acquires the distance information or the distance parameter between the first UE and the second UE, according to position information of the first UE and the second UE. For example, the base station may acquire position information of the first UE and the second UE by using an existing positioning technique, and acquire distance information between the first UE and the second UE according to the position information, or the base station may acquire the distance parameter between the first UE and the second UE from the first UE, where the distance parameter between the first UE and the second UE is acquired by the first UE according to timing advance information transmitted between the first UE and the second UE.

For example, the measurement control information may carry a mode switching threshold or a measurement event parameter, the UE may periodically report to the base station a measurement result of a D2D link obtained according to the measurement control information in a manner of a measurement report, or report to the base station in a manner of a measurement event. The measurement control information and the measurement result may be transmitted in a manner of a dedicated signaling message or be carried by an existing message. Embodiments of the present invention are not limited thereto, the measurement result may also be a flag bit carried in the dedicated signaling message, where the flag bit is used for representing the link quality or whether the distance is too large. For example, 1 indicates good quality, and 0 indicates poor quality.

In 120, when there is a need to switch the first communication mode to the second communication mode, the base station updates a connection between the base station and the first UE and/or a connection between the base station and the second UE; the base station releases the connection between the first UE and the second UE; the base station transmits a release message to the first UE and/or the second UE, so that the first UE and the second UE release the connection between the first UE and the second UE.

For example, when the base station determines that there is a need to switch the first communication mode to the second communication mode, the base station firstly updates a connection between the base station and the first UE and/or a connection between the base station and the second UE, so as to transmit services between the first UE and the second UE, and meanwhile, the base station may release configuration information relevant to the connection between the first UE and the second UE, and notifies the first UE and the second UE of releasing configuration information of the D2D connection between the first UE and the second UE, so as to switch the D2D communication mode to the UE to base station communication mode.

In 120, when the base station updates the connection between the base station and the first UE and/or the connection between the base station and the second UE, if there is a default bearer in a first air interface between the base station and the first UE and/or a second air interface between the base station and the second UE, the base station updates configuration of the first air interface and/or the second air interface according to quality of service (QoS, Quality of Service) of traffic flow between the first UE and the second UE; if there is no default bearer in a first air interface between the base station and the first UE and/or a second air interface between the base station and the second UE, the base station creates an EPS bearer in the first air interface and/or the second air interface, according to quality of service of traffic flow between the first UE and the second UE, and configures the first air interface and/or the second air interface.

For example, when the UE first initiates the service establishment, an NAS (Non-Access Stratum, non-access stratum) message includes QoS information. In the LTE system, when two UEs perform service transmission via a base station, an EPS bearer needs to be established. The EPS bearer may be divided into a default bearer and a dedicated bearer, and the EPS bearer is mapped as a radio bearer on an air interface between a UE and a base station. In the LTE system, two UEs communicating through a base station are commonly provided with a default bearer, in this case, when switching the first communication mode to the second communication mode, the base station may update the default bearer of the two UEs according to quality of service of traffic flow between the first UE and the second UE, so that the traffic flow can be transmitted between the first UE and the second UE through the base station, if there is no default bearer, an EPS bearer needs to be established for the first UE and the second UE according to quality of service of traffic flow between the first UE and the second UE, and the air interface needs to be configured, so that the traffic flow can be transmitted between the first UE and the second UE through the base station.

In 120, when there is a need to switch the second communication mode to the first communication mode, the base station notifies the first UE of transmitting a D2D connection establishment request message to the base station; the base station forwards the D2D connection establishment request message to a core network so as to authenticate and authorize the first UE; and the base station configures a connection between the first UE and the second UE after the first UE is authenticated and authorized by the core network, and updates a connection between the base station and the first UE and/or a connection between the base station and the second UE, and the base station transmits configuration information of the connection between the first UE and the second UE to the first UE and the second UE, so that the first UE and the second UE configure the connection between the first UE and the second UE.

For example, when the base station determines there is a need to switch the second communication mode to the first communication mode, the base station may notify the first UE and the second UE of initiating a process of establishing a D2D connection, and the process of establishing the D2D connection is similar to a common process of establishing a D2D connection, except that the base station configures the connection between the first UE and the second UE according to quality of service of traffic flow between the UE and the base station.

According to another embodiment of the present invention, in a case of switching the first communication mode to the second communication mode, the method further includes: the base station receives PDCP SDU data from the first UE, where the PDCP SDU data has been transmitted by the first UE to the second UE but no acknowledged feedback has been received or a not-acknowledged feedback has been received; the base station receives, from the first UE, SDU data without a PDCP sequence number, a termination identifier packet and a first sequence number corresponding to the SDU data without the PDCP sequence number; the base station numbers the SDU data without the PDCP sequence number until the termination identifier packet, according to the sequence number; the base station transmits the PDCP SDU data and the numbered SDU data to the second UE.

According to another embodiment of the present invention, in a case of switching the second communication mode to the first communication mode, the method further includes: the base station transmits PDCP SDU data to the first UE, where the PDCP SDU data has been transmitted by the first UE to the second UE but no acknowledged feedback has been received or a not-acknowledged feedback has been received; the base station transmits, to the first UE, SDU data without a PDCP sequence number, a termination identifier packet and a first sequence number corresponding to the SDU data without the PDCP sequence number, so that the first UE numbers the SDU data without the PDCP sequence number until the termination identifier packet, according to the sequence number.

According to embodiments of the present invention, a D2D communication mode can be switched to a UE to base station communication mode immediately when link quality between two D2D devices becomes poor and/or a distance is too large, thereby improving the spectrum utilization and meanwhile increasing reliability of service transmission. In addition, when the link quality recovers to normal or the distance is short enough, the UE to base station communication mode can be switched to the D2D communication mode, thereby improving the spectrum utilization.

Figure 2:
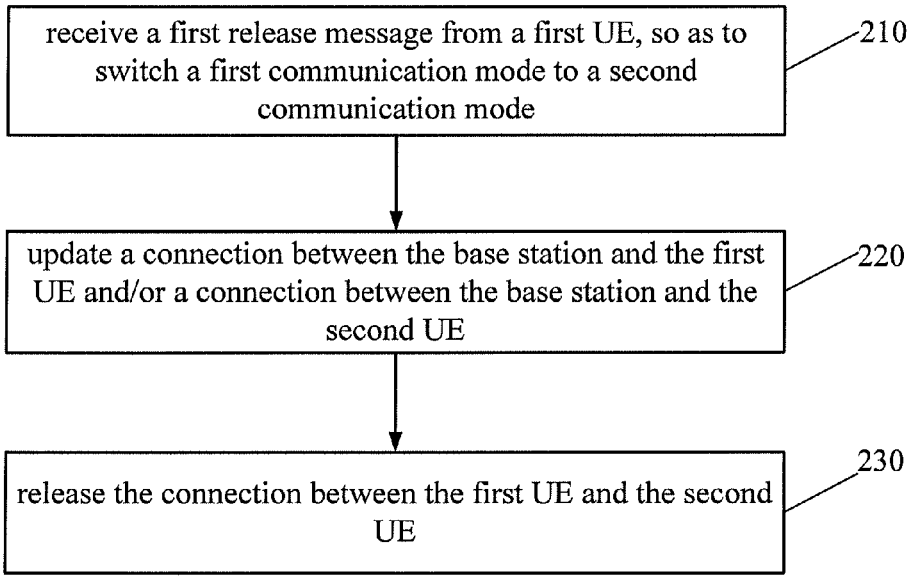
FIG. 2 is a schematic flow chart of a method for communication mode switching according to another embodiment of the present invention.

FIG. 2 is a schematic flow chart of a method for communication mode switching according to another embodiment of the present invention. The method in FIG. 2 may be implemented by a UE, which is corresponding to a portion of the method in FIG. 1 implemented by the base station, and is not repeated herein.

210, receive a first release message from a first UE, so as to switch a first communication mode to a second communication mode, where the first UE and a second UE perform D2D communication under the first communication mode, and the first UE communicates with the second UE via a base station under the second communication mode.

220, update a connection between the base station and the first UE and/or a connection between the base station and the second UE.

230, release the connection between the first UE and the second UE.

Optionally, as another embodiment, the method further includes: transmitting a second release message to the second UE, so that the second UE releases the connection between the first UE and the second UE.

Optionally, as another embodiment, the method further includes: receiving a D2D connection establishment request message from the first UE, so as to switch the second communication mode to the first communication mode; forwarding the D2D connection establishment request message to a core network so as to authenticate and authorize the first UE; configuring the connection between the first UE and the second UE after the first UE is authenticated and authorized by the core network, and updating a connection between the base station and the first UE and/or a connection between the base station and the second UE; and transmitting configuration information of the connection between the first UE and the second UE to the first UE, so that the first UE and the second UE configure the connection between the first UE and the second UE.

Optionally, as another embodiment, prior to 210, the method further includes: transmitting measurement control information to the first UE, so that the first UE measures a link quality parameter between the first UE and the second UE.

In the above technical solutions, a switching between a D2D communication mode and a UE to base station communication mode can be implemented according to the state information of the link between D2D devices, so that spectrum resources of a cellular system can be utilized effectively. According to embodiments of the present invention, a D2D communication mode can be switched to a UE to base station communication mode immediately when link quality between two D2D devices becomes poor and/or a distance is too large, thereby improving the spectrum utilization and meanwhile increasing reliability of service transmission. In addition, when the link quality recovers to normal or the distance is short enough, the UE to base station communication mode can be switched to the D2D communication mode, thereby improving the spectrum utilization.

Figure 3:
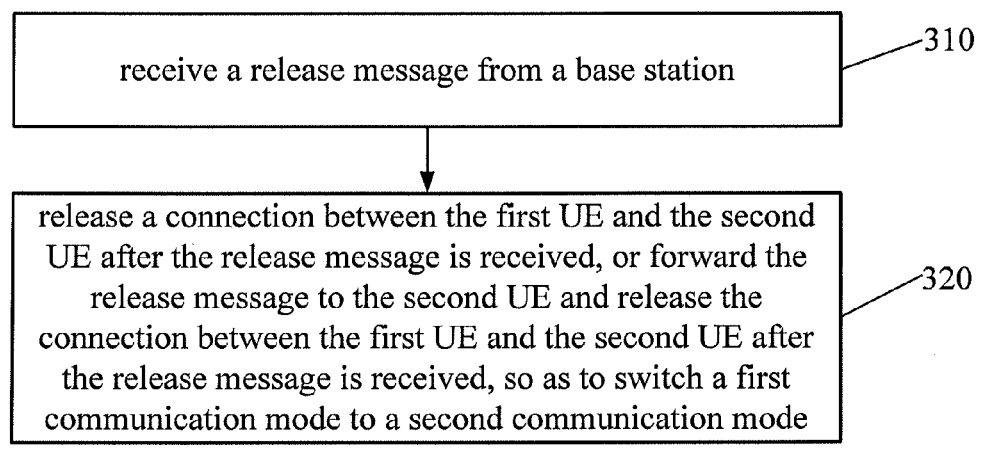
FIG. 3 is a schematic flow chart of a method for communication mode switching according to another embodiment of the present invention.

FIG. 3 is a schematic flow chart of a method for communication mode switching according to another embodiment of the present invention. The method in FIG. 3 may be implemented by a base station, which is corresponding to a portion of the method in FIG. 1 implemented by the UE, and is not repeated herein.

310, receive a release message from a base station.

320, release a connection between the first UE and the second UE after the release message is received, or forward the release message to the second UE and release the connection between the first UE and the second UE after the release message is received, so as to switch a first communication mode to a second communication mode, where the first UE and the second UE perform D2D communication under the first communication mode, and the first UE communicates with the second UE via the base station under the second communication mode.

Optionally, as another embodiment, the method further includes: transmitting a D2D connection establishment request message to the base station after the request from the base station is received, so as to switch the second communication mode to the first communication mode, and receiving configuration information of the connection between the first UE and the second UE from the base station; and configuring the connection with the second UE according to the configuration information.

Optionally, as another embodiment, the method further includes: receiving measurement control information from the base station; measuring a link between the first UE and the second UE according to the measurement control information, so as to acquire a link quality parameter between the first UE and the second UE, where the link quality parameter is used for switching the first communication mode to the second communication mode.

In the above technical solutions, a switching between a D2D communication mode and a UE to base station communication mode can be implemented according to the state information of the link between D2D devices, so that spectrum resources of a cellular system can be utilized effectively. According to embodiments of the present invention, a D2D communication mode can be switched to a UE to base station communication mode immediately when link quality between two D2D devices becomes poor and/or a distance is too large, thereby increasing reliability of service transmission. In addition, when the link quality recovers to normal or the distance is short enough, the UE to base station communication mode can be switched to the D2D communication mode, thereby improving the spectrum utilization.

Embodiments of the present invention will be described in more detail below with reference to specific examples.

Figure 4:
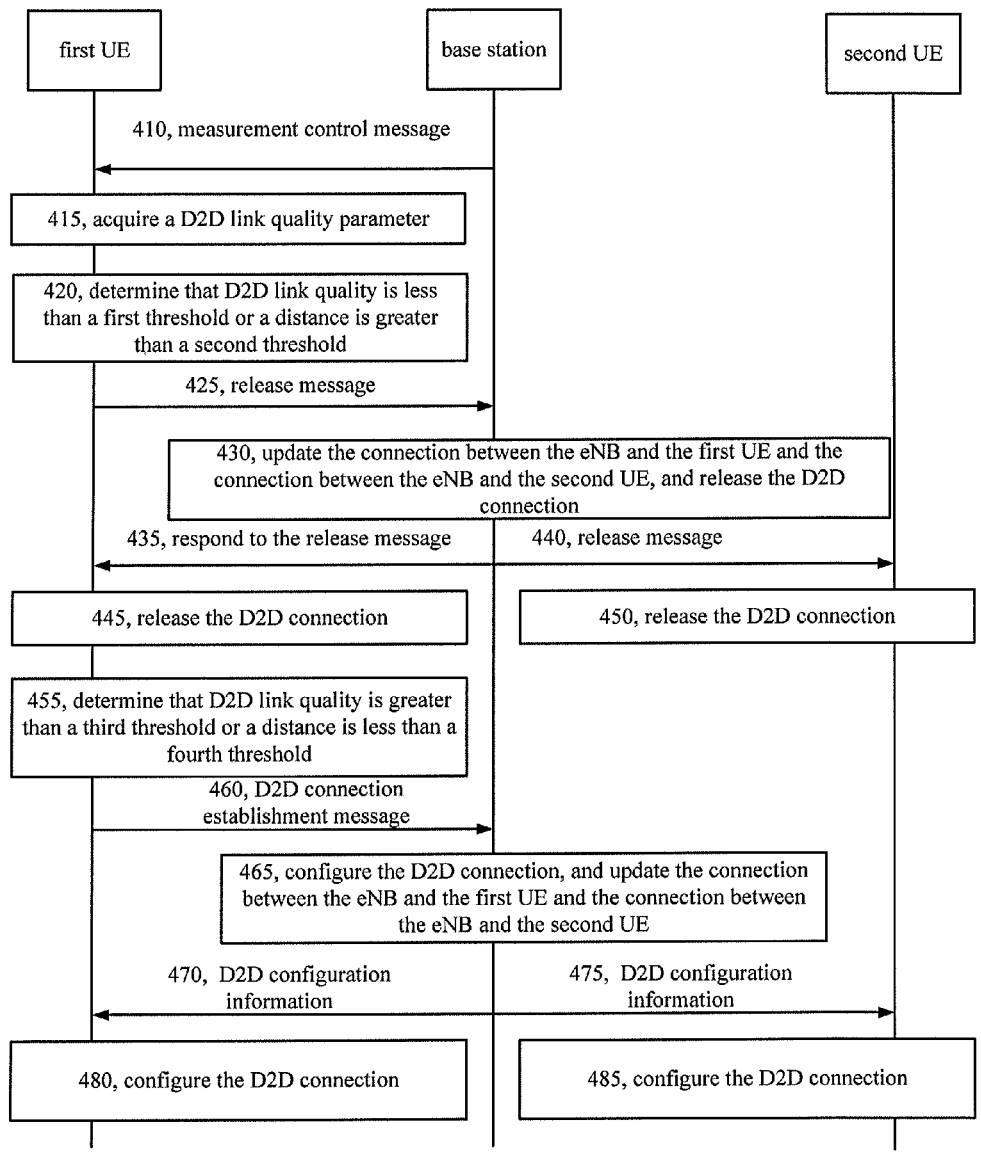
FIG. 4 is a schematic flow chart of a procedure of communication mode switching according to an embodiment of the present invention.

FIG. 4 is a schematic flow chart of a procedure of communication mode switching according to an embodiment of the present invention. The method in FIG. 4 is corresponding to a portion of the method in FIG. 1 implemented by the UE and an example of the method in FIG. 3.

410, an eNB transmits a measurement control message to the first UE. For example, the eNB may put measurement configuration information, which is based on a D2D link between the first UE and the second UE, in a dedicated information element of the measurement control message (such as, RRC Connection Reconfiguration, RRC connection reconfiguration), such as a measurement object of the D2D link (SRS, CRS, D2D-RS and distance between UEs and etc.), a measurement result of the D2D link (SRS-RSRP/RSRQ, CRS-RSRP/RSRQ, D2DRS-RSRP/RSRQ and a distance value between UEs), a measurement period, a mode switching threshold and event. The base station may specifically configure a new D2D link-specific reference signal for the measurement of the D2D link, and transmit the new D2D link-specific reference signal to the first UE through the measurement control message. The eNB may obtain a distance parameter between the first UE and the second UE according to position information of the first UE and the second UE, take the distance parameter as measurement configuration information and transmit the distance parameter to the first UE through a dedicated signaling or a measurement control message. The mode switching threshold may be a reference signal threshold or a distance threshold.

415, the first UE acquires a D2D link quality parameter according to the received measurement control message. For example, the first UE may measure a reference signal such as SRS, CRS, D2D-RS and D2D link-specific reference signal of a D2D link, so as to obtain link quality parameters, such as SRS-RSRP/RSRQ, CRS-RSRP/RSRQ, D2DRS-RSRP/RSRQ, corresponding to these reference signals. In the case of judging the mode switching by the first UE according to the distance parameter, 415 can be omitted.

420, the first UE determines that D2D link quality is less than a first threshold or a distance is greater than a second threshold. The first UE may compare the D2D link measurement result with the mode switching threshold, for example, the first UE may substitute the measurement result into a formula for a mode switching event to determine a state of the link. If determining that the D2D link quality parameter is less than the first threshold, or the distance between the first UE and the second UE is greater than the second threshold, then it can be determined that there is a need to switch the D2D communication mode to the UE to eNB communication mode.

425, when determining that there is a need to switch the D2D communication mode to the UE to eNB communication mode, the first UE transmits a release message to the eNB, so as to trigger releasing of the D2D link and switching to the link between the UE and the eNB. The request message may be carried in a dedicated signaling message or an existing message, for example, a structure of the release message may be similar to that of a message, such as a handover request message and an RRC connection release (RRC Connection Release) message transmitted by a source eNB to a target eNB while performing a cell handover.

430, after the release message is received, the eNB updates the connection between the eNB and the first UE, meanwhile updates the connection between the eNB and the second UE, and releases the D2D connection between the first UE and the second UE.

The updating of the above connection includes updating and/or establishment of a radio bearer. When there is no bearer in the air interface (Uu interface) between the UE and the eNB, a new bearer needs to be established, when there is a default bearer or other dedicated bearers in the Uu interface, the bearer needs to be updated. For example, when the default bearer of the Uu interface exists, the bearer needs to update configuration of the Uu interface according to QoS of traffic flow of the interface (Ud interface) between the first UE and the second UE; when the default bearer of the Uu interface doesn't exist, the bearer needs to create an EPS bearer in the Uu interface according to QoS of traffic flow of the Ud interface, and configure the air interface, so as to satisfy a requirement for transmitting service through the D2D connection.

435, optionally, the eNB responds to the release message transmitted by the first UE, so that the first UE releases configuration of the D2D connection.

440, the eNB transmits the release message to the second UE, so as to trigger the second UE of releasing the configuration of the D2D connection. The request message may be carried in a dedicated signaling message or an existing message, for example, a structure of the release message may be similar to that of a message, such as a handover request message and an RRC connection release message transmitted by a source eNB to a target eNB while performing a cell handover. Optionally, the release message may also be transmitted by the first UE to the second UE.

445, after the release message is transmitted or received, the first UE may release the D2D connection. For example, the first UE may delete the set configuration information of the D2D connection.

450, after the release message is received, the second UE may release the D2D connection between the first UE and the second UE. For example, the second UE may delete the set configuration information of the D2D connection.

Optionally, steps 455-485 may be performed after step 450. Embodiments of the present invention are not limited thereto, steps 455-485 may also be performed before step 420.

455, the first UE determines that the D2D link quality is greater than a third threshold or the distance is less than a fourth threshold. For example, as the first UE moves or the environment changes, the first UE finds, in a manner as similar as a neighboring cell measurement, that the D2D link quality can satisfy transmission requirements of D2D traffic, or finds that the distance is small enough through the TA information, that is, transmission requirements of D2D traffic can be satisfied, in this case, the UE can trigger the switching from the UE to eNB communication mode to the D2D communication mode.

460, the first UE transmits a D2D connection establishment message to the eNB. For example, the first UE initiates a process of establishing a D2D connection type to the eNB, so that the eNB forwards an NAS part in the request message to an MME for authentication and authorization.

465, after the D2D connection establishment message is received, the eNB configures the D2D connection, and updates the connection between the eNB and the first UE and the connection between the eNB and the second UE. For example, after the request of establishing the D2D connection type is authenticated and authorized by the core network, the eNB performs configuration of the D2D connection between the first UE and the second UE, namely, establishes the D2D bearer between the first UE and the second UE. In addition, the eNB can update the connection between the UE and the eNB, for example, update a bearer of an Uu interface according to configuration of a default bearer or release a bearer of an Uu interface.

470, the eNB transmits D2D configuration information to the first UE, where the D2D configuration information is used for configuring the D2D connection. Optionally, the eNB may transmit scheduling information to the first UE, so as to improve the resource utilization.

475, the eNB transmits D2D configuration information to the second UE, where the D2D configuration information is used for configuring the D2D connection. Optionally, the eNB may transmit scheduling information to the second UE, so as to improve the resource utilization.

480, the first UE configures the D2D connection between the first UE and the second UE. For example, the first UE configures the D2D connection according to the D2D configuration information, so as to establish the D2D connection between the first UE and the second UE.

485, the second UE configures the D2D connection between the first UE and the second UE. For example, the second UE configures the D2D connection according to the D2D configuration information, so as to establish the D2D connection between the first UE and the second UE.

In addition, in a case of switching the D2D communication mode to the UE to eNB communication mode, the following data forwarding may be performed between the first UE and the eNB. When the release message is received, the first UE firstly forwards PDCP SDU (first type) data to the eNB, where the PDCP SDU has been transmitted by the first UE to the second UE but no ACK has been received or an NACK has been received. The first UE forwards SDU (i.e., without the PDCP sequence number) data (second type) and a termination identifier packet to the eNB. Meanwhile, the first UE notifies the eNB of the first PDCP sequence number of the second type of data packet. The eNB numbers the second type of data packet until the termination identifier packet, according to the first PDCP sequence number of the second type of data packet notified by the first UE. The eNB finally transmits the PDCP SDU to the second UE. Optionally, the second UE may re-transmit all the uplink PDCP SDUs, from beginning of the first PDCP SDU packet having not been acknowledged, to the eNB.

In a case of switching the UE to eNB communication mode to the D2D communication mode, the following data forwarding may be performed between the first UE and the eNB. When the eNB receives the release message (namely, the eNB decides to release or update a bearer of an Uu interface), the eNB firstly forwards PDCP SDU (first type) data to the first UE, where the PDCP SDU has been transmitted by the eNB to the second UE but no ACK has been received or an NACK has been received. The eNB forwards SDU (i.e., without the PDCP sequence number) data (second type) and a termination identifier packet to the first UE. Meanwhile, the eNB notifies the first UE of the first sequence number of the second type of data packet. The first UE numbers the second type of data packet until the termination identifier packet, according to the first PDCP sequence number of the second type of data packet notified by the eNB. Optionally, the first UE may re-transmit all the PDCP SDUs, from beginning of the first PDCP SDU packet having not been acknowledged, to the second UE. The first UE finally transmits the PDCP SDU to the second UE. Because the second UE can receive all the PDCP SDUs from the base station and can rank the PDCP SDUs according to the PDCP sequence number during the communication mode switching, service continuity in the process of communication mode switching can be guaranteed.

Figure 5:
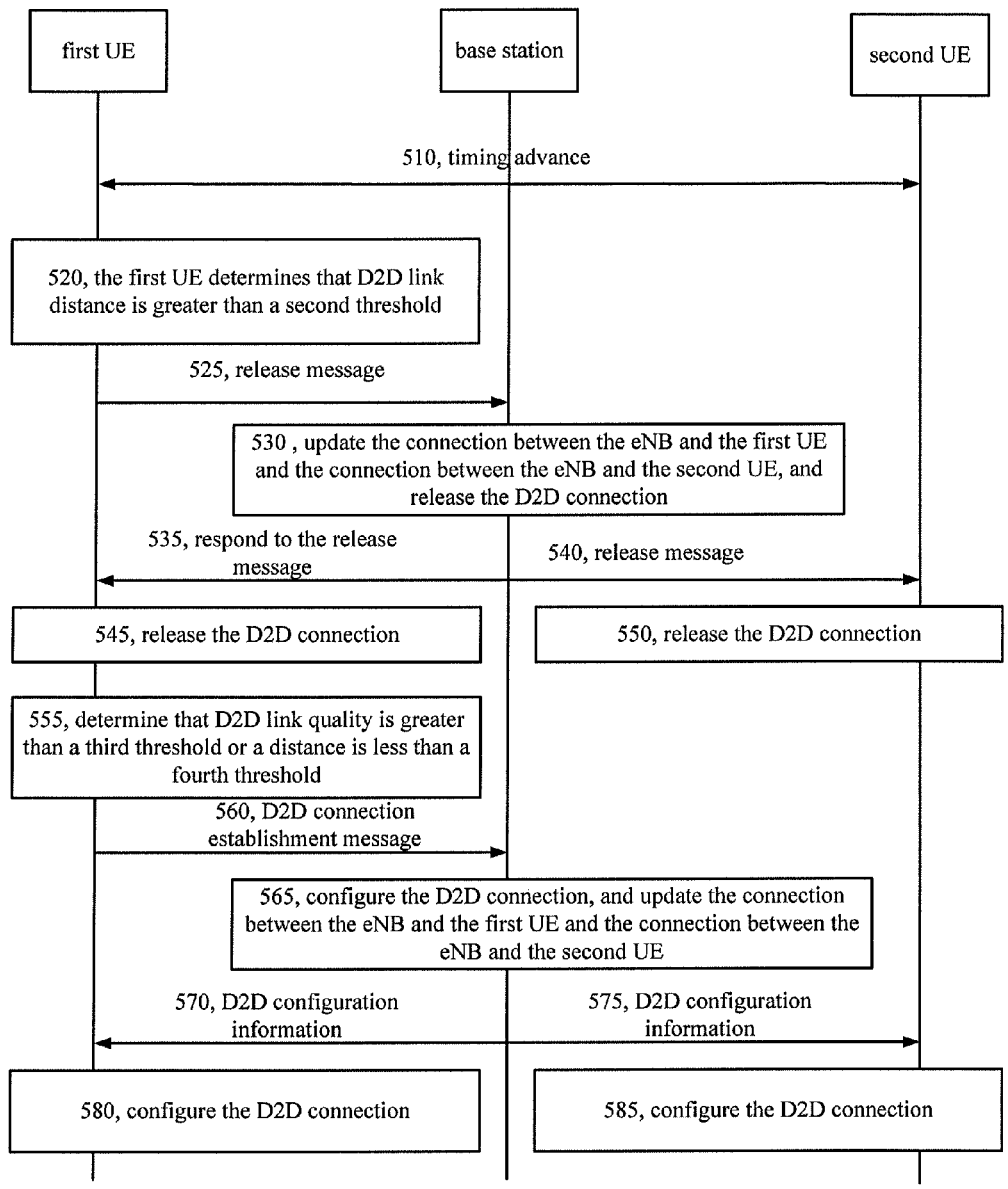
FIG. 5 is a schematic flow chart of a procedure of communication mode switching according to another embodiment of the present invention.

FIG. 5 is a schematic flow chart of a procedure of communication mode switching according to an embodiment of the present invention. The method in FIG. 5 is corresponding to a portion of the method in FIG. 1 implemented by the UE and an example of the method in FIG. 3.

510, the first UE acquires the distance parameter between the first UE and the second UE according to TA information transmitted between the first UE and the second UE, for example, a function entity similar to TA control is introduced in an MAC layer of the interface (Ud interface) between the first UE and the second UE, and the first UE can assess a distance (for example, to represent with a variable m-distance) between the two UEs according to data and/or signaling transmitted by the second UE.

520, the first UE determines that the D2D link distance is greater than a second threshold. The first UE may compare the D2D link distance with the mode switching threshold. If determining that the distance between the first UE and the second UE is greater than the second threshold, then it can be determined that there is a need to switch the D2D communication mode to the UE to eNB communication mode.

Steps 525 to 585 in FIG. 5 are the same as steps 425 to 485 in FIG. 4, and thus are not repeated herein.

Figure 6:
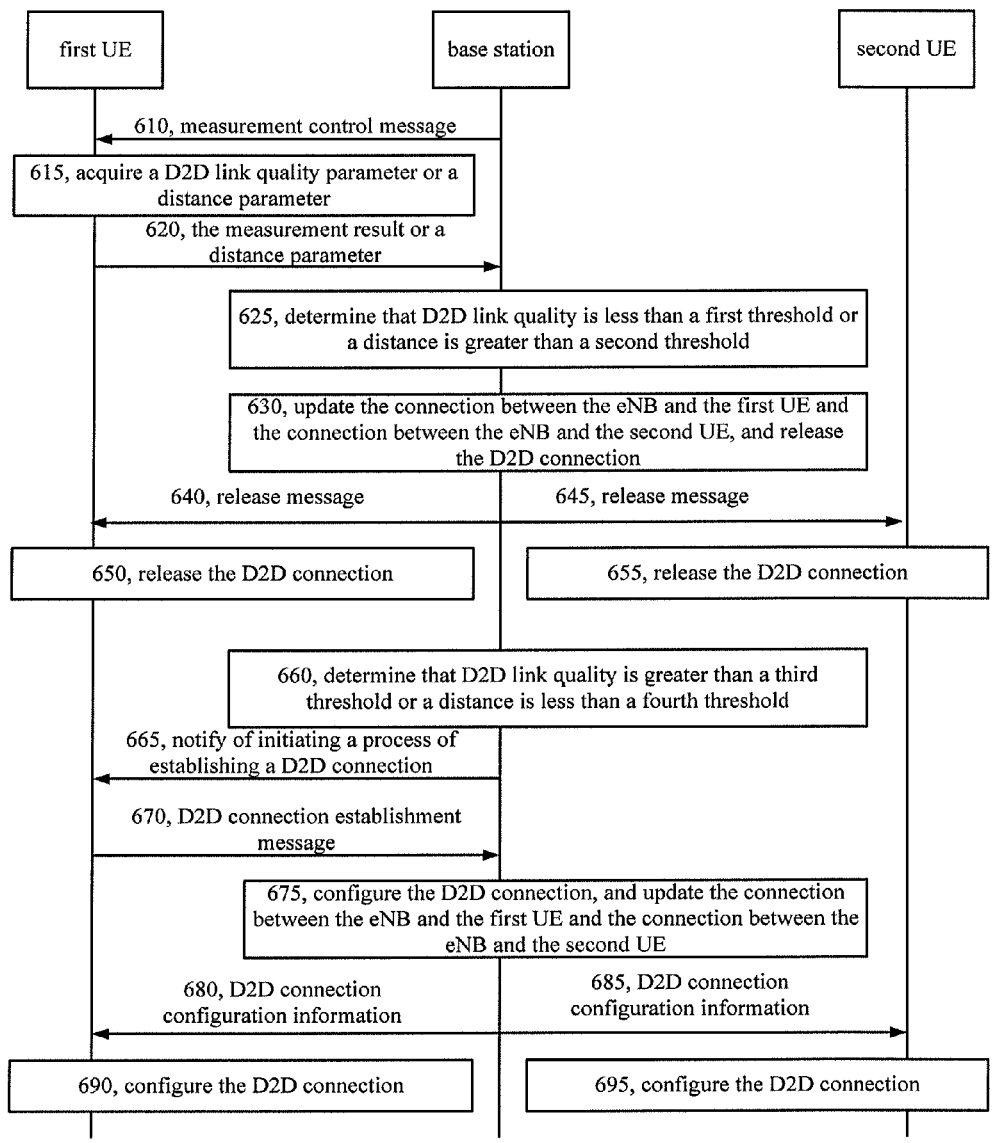
FIG. 6 is a schematic flow chart of a procedure of communication mode switching according to another embodiment of the present invention.

FIG. 6 is a schematic flow chart of a procedure of communication mode switching according to another embodiment of the present invention. The method in FIG. 6 is corresponding to a portion in FIG. 1 implemented by the base station and an example of the method in FIG. 2.

610, the eNB transmits a measurement control message to the first UE. Step 610 in FIG. 6 is similar to step 410 in FIG. 4, and thus is not repeated herein.

615, the first UE acquires a D2D link quality parameter according to the received measurement control message, or acquires a distance parameter between the first UE and the second UE according to TA information transmitted between the first UE and the second UE. Step 615 in FIG. 6 is similar to step 415 in FIG. 4 and step 510 in FIG. 5, and thus is not repeated herein.

620, the first UE reports to the eNB the measurement result, such as a link quality parameter or a distance parameter.

625, the eNB determines that D2D link quality is less than a first threshold or a distance is greater than a second threshold. The eNB may compare the D2D link measurement result with the mode switching threshold, for example, the first UE may substitute the measurement result into a formula for a mode switching event to determine a state of the link. If the base station determines that the D2D link quality parameter is less than the first threshold, or the distance between the first UE and the second UE is greater than the second threshold, then it can be determined that there is a need to switch the D2D communication mode to the UE to eNB communication mode.

630, the eNB updates the connection between the eNB and the first UE, and the connection between the eNB and the second UE, and releases the D2D connection between the first UE and the second UE. Step 630 in FIG. 6 is similar to step 430 in FIG. 4, and thus is not repeated herein.

640, the eNB transmits the release message to the first UE, so that the first UE releases configuration of the D2D connection.

645, the eNB transmits the release message to the second UE, so as to trigger the UE of releasing the configuration of the D2D connection. Optionally, the release message may also be transmitted by the first UE to the second UE.

650, after the release message is received, the first UE can release the D2D connection. For example, the first UE may delete the set configuration information of the D2D connection.

655, after the release message is received, the second UE can release the D2D connection between the first UE and the second UE. For example, the second UE may delete the set configuration information of the D2D connection.

Optionally, steps 660-695 may be performed after step 655. Embodiments of the present invention are not limited thereto, steps 660-695 may be performed before step 625.

660, the eNB determines that D2D link quality is greater than a third threshold or a distance is less than a fourth threshold. For example, as the first UE moves or the environment changes, the first UE finds, in a manner as similar as a neighboring cell measurement, that the D2D link quality can satisfy transmission requirements of D2D traffic, or finds that the distance is small enough through the TA information, that is, transmission requirements of D2D traffic can be satisfied, in this case, the UE can periodically report state information of the D2D link to the base station in a manner of a measurement report or in a manner of an event. The base station determines that link quality is greater than a third threshold or a distance is less than a fourth threshold according to a measurement report reported by the UE, so as to trigger switching from the UE to eNB communication mode to the D2D communication mode.

665, the eNB initiates a process of establishing a D2D connection through the first UE.

670, after the request is received, the first UE transmits a D2D connection establishment request message to the eNB. For example, the first UE initiates a process of establishing a D2D connection type to the eNB, so that the eNB forwards an NAS part in the request message to an MME for authentication and authorization.

675, the eNB configures the D2D connection, and updates the connection between the eNB and the first UE and the connection between the eNB and the second UE. Step 675 in FIG. 6 is similar to step 465 in FIG. 4, and thus is not repeated herein.

680, the eNB transmits D2D configuration information to the first UE, wherein the D2D configuration information is used for configuring the D2D connection. Optionally, the eNB may transmit scheduling information to the first UE, so as to improve the resource utilization.

685, the eNB transmits D2D configuration information to the second UE, wherein the D2D configuration information is used for configuring the D2D connection. Optionally, the eNB may transmit scheduling information to the second UE, so as to improve the resource utilization.

690, the first UE configures the D2D connection between the first UE and the second UE. For example, the first UE configures the D2D connection according to the D2D configuration information, so as to establish the D2D connection between the first UE and the second UE.

695, the second UE configures the D2D connection between the first UE and the second UE. For example, the second UE configures the D2D connection according to the D2D configuration information, so as to establish the D2D connection between the first UE and the second UE.

In addition, in the process of communication mode switching, the PDCP SDU data forwarding described in the procedure of communication mode switching shown in FIG. 4 may be performed between the UE and the eNB.

Figure 7:
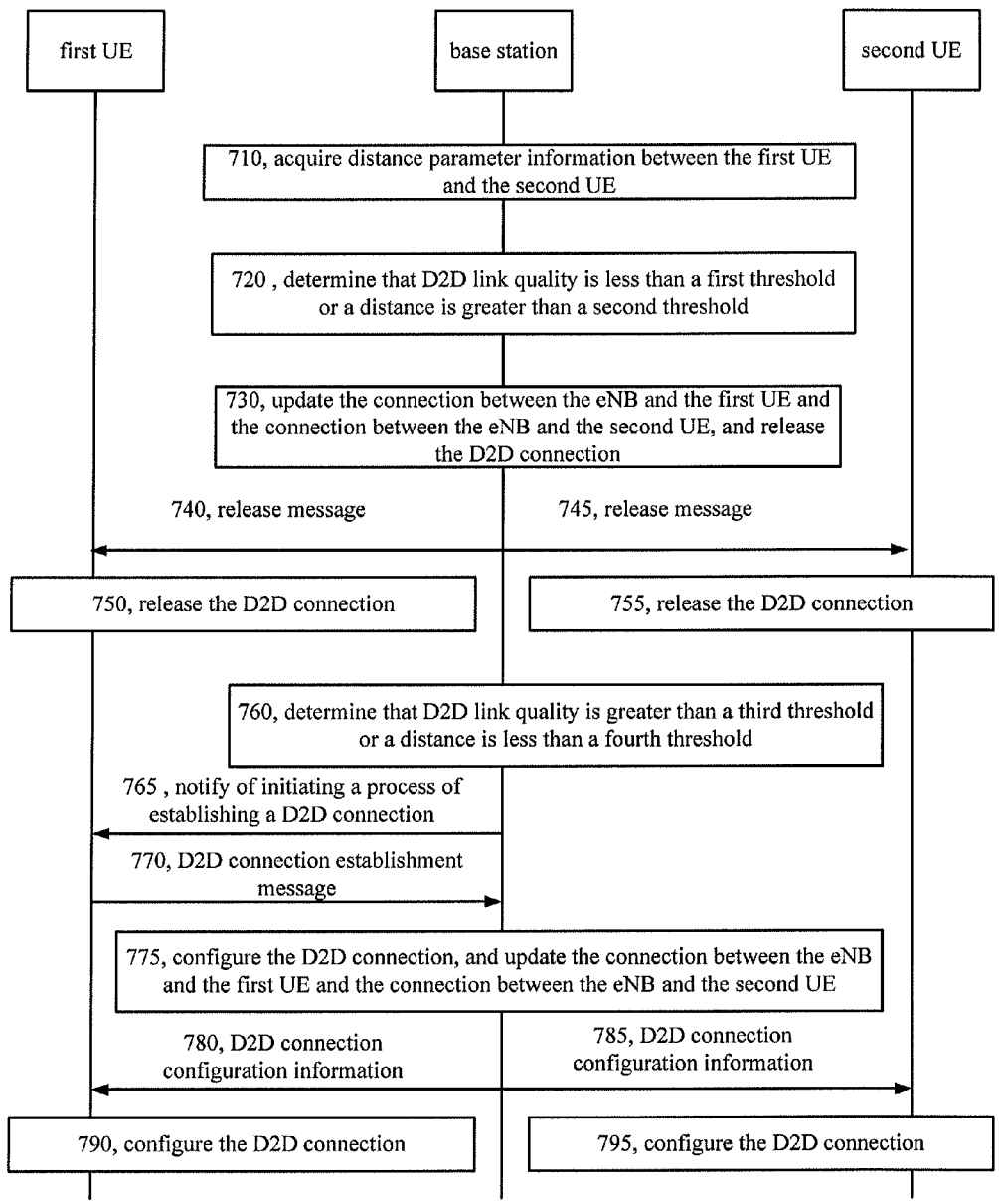
FIG. 7 is a schematic flow chart of a procedure of communication mode switching according to another embodiment of the present invention.

FIG. 7 is a schematic flow chart of a procedure of communication mode switching according to another embodiment of the present invention. The method in FIG. 7 is an example of the method in FIG. 1 implemented by the base station and the method in FIG. 2.

710, the eNB acquires position information of the first UE and the second UE by using an existing positioning technique, and acquires distance parameter information between the first UE and the second UE according to the position information of the first UE and the second UE.

720, the eNB determines that D2D link distance is greater than a second threshold. The eNB may compare the D2D link distance with the mode switching threshold, if determining that the distance between the first UE and the second UE is greater than the second threshold, then it can be determined that there is a need to switch the D2D communication mode to the UE to eNB communication mode.

Steps 730-795 of the method in FIG. 7 are similar to steps 630-695 of the method in FIG. 6, and thus are not repeated herein.

The method for communication mode switching according to an embodiment of the present invention has been described above, and the apparatus for communication mode switching according to embodiments of the present invention will be respectively described hereinafter with reference to FIG. 8 to FIG. 10.

Figure 8:
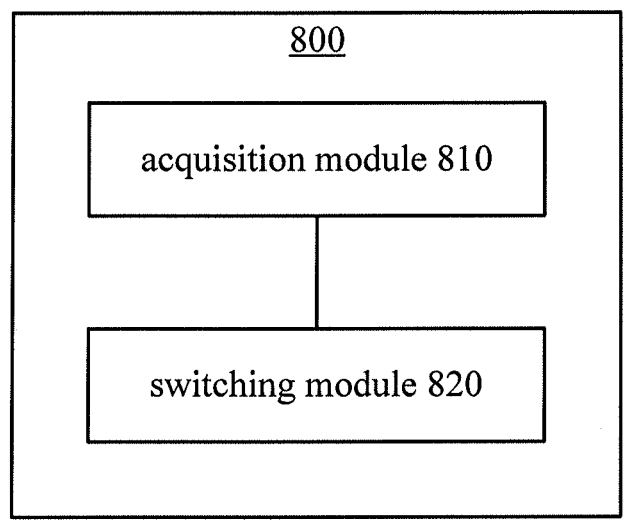
FIG. 8 is a schematic structural diagram of an apparatus for communication mode switching according to another embodiment of the present invention.

FIG. 8 is a schematic structural diagram of an apparatus 800 for communication mode switching according to an embodiment of the present invention. The apparatus 800 in FIG. 8 may be a base station or a UE. The apparatus 800 in FIG. 8 includes an acquisition module 810 and a switching module 820.

The acquisition module 810 acquires state information of a D2D link between a first UE and a second UE. The switching module 820 implements a switching between a first communication mode and a second communication mode according to the state information of the D2D link between the first UE and the second UE, where the first UE and the second UE perform D2D communication under the first communication mode, and the first UE communicates with the second UE via a base station under the second communication mode.

In the above technical solutions, a switching between a D2D communication mode and a UE to base station communication mode can be implemented according to the state information of the link between D2D devices, so that spectrum resources of a cellular system can be utilized effectively.

Optionally, as an embodiment, the state information of the D2D link includes a link quality parameter or a distance parameter, the switching module 820 switches the first communication mode to the second communication mode, when the link quality parameter between the first UE and the second UE is less than a first preset threshold, or the distance parameter between the first UE and the second UE is greater than a second preset threshold; or switches the second communication mode to the first communication mode, when the link quality parameter between the first UE and the second UE is greater than a third preset threshold, or the distance parameter between the first UE and the second UE is less than a fourth preset threshold.

Optionally, as another embodiment, in the case that the apparatus 800 is a UE, the acquisition module 810 acquires measurement control information from the base station, measures a link between the first UE and the second UE according to the measurement control information, so as to acquire the link quality parameter between the first UE and the second UE, or acquires the distance parameter between the first UE and the second UE according to timing advance information transmitted between the first UE and the second UE, or acquires the distance parameter between the first UE and the second UE from the base station, where the distance parameter is acquired by the base station according to distance parameter between the first UE and the second UE.

Optionally, as another embodiment, in the case that the apparatus 800 is a UE, the switching module 820 transmits a first release message to the base station, transmits a second release message to the second UE, and releases the connection between the first UE and the second UE.

Optionally, as another embodiment, in the case that the apparatus 800 is a UE, the switching module 820 transmits a D2D connection establishment request message to the base station, and receives configuration information of the connection between the first UE and the second UE from the base station, so that the first UE configures the connection with the second UE according to the configuration information.

Optionally, as another embodiment, in the case that the apparatus 800 is a base station, the acquisition module 810 transmits measurement control information to the first UE, receives a measurement result from the first UE, and acquires the link quality parameter between the first UE and the second UE according to the measurement result, or acquires the distance parameter between the first UE and the second UE according to position information of the first UE and the second UE, or acquires the distance parameter between the first UE and the second UE from the first UE, where the distance parameter is acquired by the first UE according to timing advance information transmitted between the first UE and the second UE, Optionally, as another embodiment, in the case that the apparatus 800 is a base station, the switching module 820 updates a connection between the base station and the first UE and/or a connection between the base station and the second UE, releases a connection between the first UE and the second UE, and transmits a release message to the first UE and/or the second UE.

Optionally, as another embodiment, in the case that the apparatus 800 is a base station, the switching module 820 notifies the first UE of transmitting a D2D connection establishment request message to the base station, forwards the D2D connection establishment request message to a core network so as to authenticate and authorize the first UE, configures a connection between the first UE and the second UE after the first UE is authenticated and authorized by the core network, updates a connection between the base station and the first UE and/or a connection between the base station and the second UE, and transmits configuration information of the connection between the first UE and the second UE to the first UE and the second UE.

In the above technical solutions, a switching between a D2D communication mode and a UE to base station communication mode can be implemented according to the state information of the link between D2D devices, so that spectrum resources of a cellular system can be utilized effectively. According to embodiments of the present invention, a D2D communication mode can be switched to a UE to base station communication mode immediately when link quality between two D2D devices becomes poor and/or a distance is too large, thereby improving the spectrum utilization and meanwhile increasing reliability of service transmission. In addition, when the link quality recovers to normal or the distance is short enough, the UE to base station communication mode can be switched to the D2D communication mode, thereby improving the spectrum utilization.

Operations and functions for each unit of the base station 800 can refer to the method in FIG. 1, which are not repeated herein, so as to avoid repetition.

Figure 9:
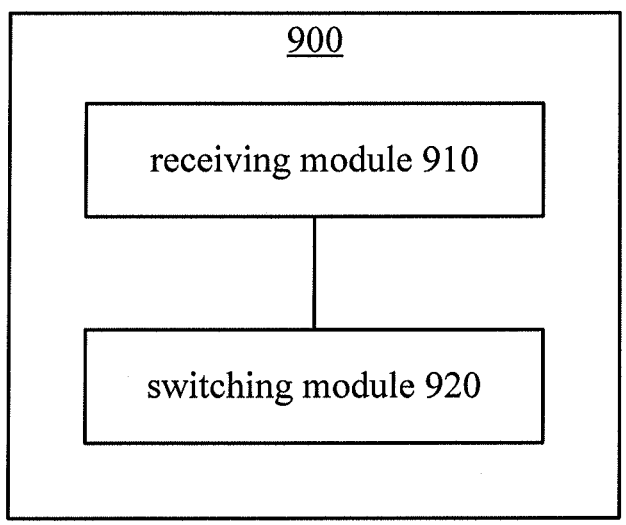
FIG. 9 is a schematic structural diagram of a base station according to another embodiment of the present invention.

FIG. 9 is a schematic structural diagram of a base station 900 according to another embodiment of the present invention. The apparatus 900 in FIG. 9 includes a receiving module 910 and a switching module 920.

The receiving module 910 receives a first release message from a first UE, so as to switch a first communication mode to a second communication mode, where the first UE and the second UE perform D2D communication under the first communication mode, and the first UE communicates with the second UE via the base station under the second communication mode. The switching module 920 updates a connection between the base station and the first UE and/or a connection between the base station and the second UE, and releases a connection between the first UE and the second UE.

Optionally, as another embodiment, the switching module 920 further transmits a second release message to the second UE, so that the second UE releases the connection between the first UE and the second UE.

Optionally, as another embodiment, the receiving module 910 further receives a D2D connection establishment request message from the first UE, so as to switch the second communication mode to the first communication mode, the switching module 920 further forwards the D2D connection establishment request message to a core network so as to authenticate and authorize the first UE, the switching module 920 further configures the connection between the first UE and the second UE after the first UE is authenticated and authorized by the core network, updates a connection between the base station and the first UE and/or a connection between the base station and the second UE, and transmits configuration information of the connection between the first UE and the second UE to the first UE, so that the first UE configures the connection between the first UE and the second UE, according to the configuration information.

In the above technical solutions, a switching between a D2D communication mode and a communication mode in which the communication is realized via a base station can be implemented according to the state information of the link between D2D devices, so that spectrum resources of a cellular system can be utilized effectively. According to embodiments of the present invention, a D2D communication mode can be switched to a UE to base station communication mode immediately when link quality between two D2D devices becomes poor and/or a distance is too large, thereby improving the spectrum utilization and meanwhile increasing reliability of service transmission. In addition, when the link quality recovers to normal or the distance is short enough, the UE to base station communication mode can be switched to the D2D communication mode, thereby improving the spectrum utilization.

Operations and functions for each unit of the base station 900 can refer to the method in FIG. 2, which are not repeated herein, so as to avoid repetition.

Figure 10:
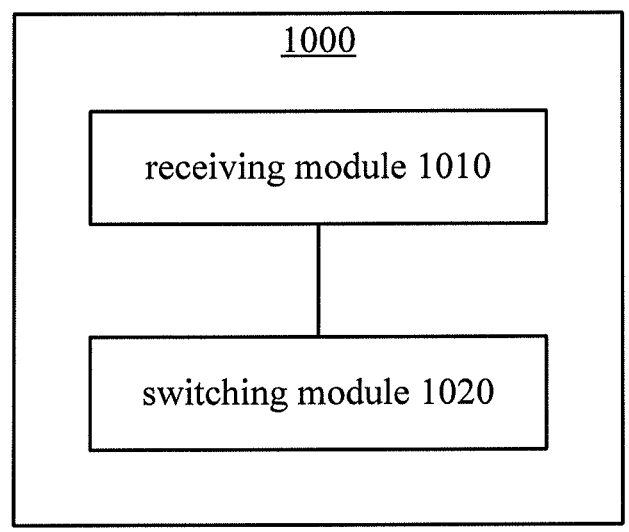
FIG. 10 is a schematic structural diagram of a user equipment according to another embodiment of the present invention.

FIG. 10 is a schematic structural diagram of a user equipment 1000 according to another embodiment of the present invention. The UE 1000 in FIG. 10 includes a reception module 1010 and a switching module 1020.

The reception module 1010 receives a release message from a base station; The switching module 1020 releases a connection between the first UE and the second UE after the release message is received, or forwards the release message to the second UE and releases the connection between the first UE and the second UE after the release message is received, so as to switch a first communication mode to a second communication mode, where the first UE and the second UE perform D2D communication under the first communication mode, and the first UE communicates with the second UE via a base station under the second communication mode.

Optionally, as another embodiment, the switching module 1020 further transmits a D2D connection establishment request message to the base station after the request from the base station is received, so as to switch the second communication mode to the first communication mode, and receives configuration information of the connection between the first UE and the second UE from the base station, where the switching module 1020 enables the first UE to configure the connection with the second UE according to the configuration information.

In the above technical solutions, a switching between a D2D communication mode and a communication mode in which the communication is realized via a base station can be implemented according to the state information of the link between D2D devices, so that spectrum resources of a cellular system can be utilized effectively. According to embodiments of the present invention, a D2D communication mode can be switched to a UE to base station communication mode immediately when link quality between two D2D devices becomes poor and/or a distance is too large, thereby improving the spectrum utilization and meanwhile increasing reliability of service transmission. In addition, when the link quality recovers to normal or the distance is short enough, the UE to base station communication mode can be switched to the D2D communication mode, thereby improving the spectrum utilization.

Operations and functions for each unit of the UE 1000 can refer to the method in FIG. 3, which are not repeated herein, so as to avoid repetition.

Persons of ordinary skill in the art are aware that the various exemplary units and algorithm steps described in connection with the embodiments disclosed herein can be implemented as electronic hardware, or a combination of computer software and electronic hardware. Whether such functionality is implemented as hardware or software depends upon the particular application of the technical solution and design constraints. Professional technicians may implement the described functionality in varying ways for each particular application, but such implementation decisions should not be interpreted as causing a departure from the scope of the present information.

Persons skilled in the art can understand that, for convenience and brevity of description, the detailed working procedures of the systems, apparatuses, and units described above can be deduced effortlessly from the corresponding procedures in the method embodiments, and are not repeated herein.

Understandably, in the embodiments described herein, the disclosed systems, apparatuses and methods may be implemented in other modes. For example, the apparatus embodiments described above are illustrative in nature, for example, the units of the device are defined from the perspective of logical functions only and may be defined in a different way in practical application. For example, multiple units or components may be combined or integrated into another system, or some features may be ignored or not executed. Besides, the coupling, direct coupling or communication connection illustrated or discussed herein may be implemented through indirect coupling or communication connection between interfaces, devices or units, and may be electronic, mechanical, or in other forms.

The units described as stand-alone components above may be separated physically or not; and the components illustrated as units may be physical units or not, namely, they may be located in one place, or distributed on multiple network elements. Some or all of the units described above may be selected as required to fulfill the objectives of the technical solutions of the present invention.

Besides, all functional units in embodiments of the present invention may be physically stand-alone, or integrated into a processing module, or two or more of the units are integrated into one unit.

When being implemented as a software function unit and sold or used as a stand-alone product, the functionality may be stored in a computer-readable storage medium. Therefore, the essence of the technical solution of the present invention, or its contribution to the prior art, or part of the technical solutions, may be embodied in a software product. The software product may be stored in a computer-readable storage medium and incorporates several instructions for instructing a computer device (for example, personal computer, server, or network device) to execute all or part of the steps of the method specified in any embodiment of the present invention. Examples of the storage medium include various media capable of storing program codes, such as a USB flash disk, a mobile hard disk, a read-only memory (ROM, Read-Only Memory), a random access memory (RAM, Random Access Memory), a magnetic disk, or an optical disk.

The above descriptions are merely preferred embodiments of the present invention, but not intended to limit the protection scope of the present invention. Any modifications, variations or replacement that can be easily derived by persons skilled in the art within the technical scope disclosed by the present invention shall fall within the protection scope of the present invention. Therefore, the protection scope of the present invention is subject to the appended claims.

What is claimed is:

1. A method for communication mode switching, comprising:

acquiring state information of a device-to-device link between a first user equipment (UE) and a second UE; and implementing a switching between a first communication mode and a second communication mode according to the state information of the device-to-device link between the first UE and the second UE, wherein the first UE and the second UE perform device-to-device communication under the first communication mode, and the first UE communicates with the second UE via a base station under the second communication mode;

wherein the state information of the device-to-device link comprises a link quality parameter or a distance parameter, and wherein the implementing the switching between the first communication mode and the second communication mode according to the state information of the device-to-device link between the first UE and the second UE, comprises one of the following:

switching from the first communication mode to the second communication mode, when the link quality parameter between the first UE and the second UE is less than a first preset threshold, or the distance parameter between the first UE and the second UE is greater than a second preset threshold; and switching from the second communication mode to the first communication mode, when the link quality parameter between the first UE and the second UE is greater than a third preset threshold, or the distance parameter between the first UE and the second UE is less than a fourth preset threshold, wherein, in a case of switching from the first communication mode to the second communication mode, the method further comprises:

receiving, by the base station, packet data convergence protocol (PDCP) service data unit (SDU) data from the first UE, wherein the PDCP SDU data has been transmitted by the first UE to the second UE but no acknowledged feedback has been received or a not-acknowledged feedback has been received;

receiving, by the base station, from the first UE, SDU data without a PDCP sequence number, a termination identifier packet and a first sequence number corresponding to the SDU data without the PDCP sequence number;

numbering, by the base station, the SDU data without the PDCP sequence number until the termination identifier packet, according to the sequence number;

transmitting, by the base station, the PDCP SDU data and the numbered SDU data to the second UE; and, wherein, in a case of switching from the second communication mode to the first communication mode, the method further comprises:
transmitting, by the base station, PDCP SDU data to the first UE, wherein the PDCP SDU data has been transmitted by the base station to the second UE but no acknowledged feedback has been received or a not-acknowledged feedback has been received;
transmitting, by the base station, to the first UE, SDU data without a PDCP sequence number, a termination identifier packet and a first sequence number corresponding to the SDU data without the PDCP sequence number, and the first UE numbers the SDU data without the PDCP sequence number until the termination identifier packet, according to the sequence number.

2. The method according to claim 1, wherein the link quality information between the first UE and the second UE comprises: a measurement result obtained by measuring at least one of a sounding reference signal, a cell-specific reference signal and a device-to-device link-specific reference signal.

3. The method according to claim 1, wherein acquiring the link quality parameter between the first UE and the second UE comprises:
transmitting, by the base station, measurement control information to the first UE, so that the first UE measures the link between the first UE and the second UE according to the measurement control information;
receiving, by the base station, a measurement result from the first UE, and acquiring the link quality parameter between the first UE and the second UE according to the measurement result.

4. The method according to claim 1, wherein acquiring the link distance parameter between the first UE and the second UE comprises one of the following:
acquiring, by the base station, the distance parameter between the first UE and the second UE, according to position information of the first UE and the second UE; and
acquiring, by the base station, the distance parameter between the first UE and the second UE from the first UE, wherein the distance parameter is acquired by the first UE according to timing advance information transmitted between the first UE and the second UE.

5. The method according to claim 1, wherein the switching from the first communication mode to the second communication mode, comprises:
updating, by the base station, a connection between the base station and the first UE and/or a connection between the base station and the second UE;
releasing, by the base station, the connection between the first UE and the second UE; and
transmitting, by the base station, a release message to the first UE and/or the second UE, so that the first UE and the second UE release the connection between the first UE and the second UE.

6. The method according to claim 1, wherein the switching from the second communication mode to the first communication mode, comprises:
notifying, by the base station, the first UE of transmitting a device-to-device connection establishment request message to the base station;
forwarding, by the base station, the device-to-device connection establishment request message to a core network so as to authenticate and authorize the first UE;
configuring, by the base station, the connection between the first UE and the second UE after the first UE is authenticated and authorized by the core network, and updating a connection between the base station and the first UE and/or a connection between the base station and the second UE; and
transmitting, by the base station, configuration information of the connection between the first UE and the second UE to the first UE and the second UE, so that the first UE and the second UE configure the connection between the first UE and the second UE.

7. The method according to claim 6, wherein updating, by the base station, the connection between the base station and the first UE and/or the connection between the base station and the second UE, comprises:
when there is a default bearer in a first air interface between the base station and the first UE and/or a second air interface between the base station and the second UE, updating, by the base station, configuration of the first air interface and/or the second air interface according to quality of service of traffic flow between the first UE and the second UE; and
when there is no default bearer in a first air interface between the base station and the first UE and/or a second air interface between the base station and the second UE, creating, by the base station, an evolved packet system bearer in the first air interface and/or the second air interface according to quality of service of traffic flow between the first UE and the second UE, and configuring the first air interface and/or the second air interface.

8. An apparatus for communication mode switching, comprising a processor and a non-transitory computer readable storage medium including executable instructions that, when executed by the processor perform a method comprising:
acquiring state information of a device-to-device link between a first UE and a second UE; and
implementing a switching between a first communication mode and a second communication mode according to the state information of the device-to-device link between the first UE and the second UE, wherein the first UE and the second UE perform device-to-device communication under the first communication mode, and the first UE communicates with the second UE via a base station under the second communication mode;
wherein the state information of the device-to-device link comprises a link quality parameter or a distance parameter, and wherein the implementing the switching between the first communication mode and the second communication mode according to the state information of the device-to-device link between the first UE and the second UE, comprises one of the following:
switching from the first communication mode to the second communication mode, when the link quality parameter between the first UE and the second UE is less than a first preset threshold, or the distance parameter between the first UE and the second UE is greater than a second preset threshold; and
switching from the second communication mode to the first communication mode, when the link quality parameter between the first UE and the second UE is greater than a third preset threshold, or the distance parameter between the first UE and the second UE is less than a fourth preset threshold;
wherein the apparatus is the base station and, in a case of switching from the first communication mode to the second communication mode, the method, further comprises:

receiving packet data convergence protocol (PDCP) service data unit (SDU) data from the first UE, wherein the PDCP SDU data has been transmitted by the first UE to the second UE but no acknowledged feedback has been received or a not-acknowledged feedback has been received;

receiving from the first UE SDU data without a PDCP sequence number, a termination identifier packet and a first sequence number corresponding to the SDU data without the PDCP sequence number;

numbering the SDU data without the PDCP sequence number until the termination identifier packet, according to the sequence number; and transmitting the PDCP SDU data and the numbered SDU data to the second UE;

and, wherein, in a case of switching from the second communication mode to the first communication mode, the switching module is further configured to:

transmitting PDCP SDU data to the first UE, wherein the PDCP SDU data has been transmitted by the base station to the second UE but no acknowledged feedback has been received or a not-acknowledged feedback has been received; and transmitting to the first UE SDU data without a PDCP sequence number, a termination identifier packet and a first sequence number corresponding to the SDU data without the PDCP sequence number, and the first UE numbers the SDU data without the PDCP sequence number until the termination identifier packet, according to the sequence number.

9. The apparatus according to claim 8, wherein the apparatus is the base station, the method comprising:

transmitting measurement control information to the first UE, receiving a measurement result from the first UE, and acquiring the link quality parameter between the first UE and the second UE according to the measurement result, or acquiring the distance parameter between the first UE and the second UE according to position information of the first UE and the second UE, or acquiring, the distance parameter between the first UE and the second UE from the first UE, wherein the distance parameter is acquired by the first UE according to timing advance information transmitted between the first UE and the second UE.

10. The apparatus according to claim 8, wherein the apparatus is the base station, the method comprises: updating a connection between the base station and the first UE and/or a connection between the base station and the second UE, releasing the connection between the first UE and the second UE, and transmitting a release message to the first UE and/or the second UE.

11. The apparatus according to claim 8, the method comprises: notifying the first UE of transmitting a device-to-device connection establishment request message to the base station, forwarding the device-to-device connection establishment request message to a core network so as to authenticate and authorize the first UE, configuring the connection between the first UE and the second UE after the first UE is authenticated and authorized by the core network, updating a connection between the base station and the first UE and/or a connection between the base station and the second UE, and transmitting configuration information of the connection between the first UE and the second UE to the first UE and the second UE.

* * * * *